(12) United States Patent
Hardin et al.

(10) Patent No.: US 10,558,209 B1
(45) Date of Patent: Feb. 11, 2020

(54) SYSTEM AND METHOD FOR COOPERATIVE OPERATION OF PILOTED AND OPTIONALLY PILOTED AIRCRAFT

(71) Applicant: Rockwell Collins, Inc., Cedar Rapids, IA (US)

(72) Inventors: David S. Hardin, Cedar Rapids, IA (US); Jennifer A. Davis, Cedar Rapids, IA (US); Jing Liu, Cedar Rapids, IA (US); James A. Marek, Anamosa, IA (US); Ryan P. Littler, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 213 days.

(21) Appl. No.: 15/621,872

(22) Filed: Jun. 13, 2017

(51) Int. Cl.
| | |
|---|---|
| *G05D 1/00* | (2006.01) |
| *G05D 1/10* | (2006.01) |
| *G08G 5/00* | (2006.01) |
| *G08G 5/04* | (2006.01) |
| *B64C 39/02* | (2006.01) |

(52) U.S. Cl.
CPC ......... *G05D 1/0027* (2013.01); *B64C 39/024* (2013.01); *G05D 1/104* (2013.01); *G08G 5/0008* (2013.01); *G08G 5/0021* (2013.01); *G08G 5/0034* (2013.01); *G08G 5/0069* (2013.01); *G08G 5/04* (2013.01); *B64C 2201/141* (2013.01); *B64C 2201/146* (2013.01)

(58) Field of Classification Search
CPC .... G05D 1/0027; G05D 1/104; B64C 39/024; B64C 2201/146; B64C 2201/141; G08G 5/0021; G08G 5/0034; G08G 5/0069; G08G 5/0008; G08G 5/04
See application file for complete search history.

(56) References Cited

U.S. PATENT DOCUMENTS

| | | | |
|---|---|---|---|
| 9,415,869 B1* | 8/2016 | Chan | B64C 39/024 |
| 10,095,230 B1* | 10/2018 | Hardin | G05D 1/0088 |
| 2009/0299619 A1* | 12/2009 | Dean | G01C 21/00 701/532 |
| 2016/0071421 A1* | 3/2016 | Bousquet | G08G 5/0047 701/467 |
| 2017/0023939 A1* | 1/2017 | Krouse | G05D 1/0022 |
| 2017/0235316 A1* | 8/2017 | Shattil | B64C 39/024 701/3 |
| 2017/0254622 A1* | 9/2017 | Evans | F41G 7/2206 |
| 2018/0004201 A1* | 1/2018 | Zach | G05D 1/0022 |

* cited by examiner

*Primary Examiner* — Rodney A Butler
(74) *Attorney, Agent, or Firm* — Suiter Swantz pc llo

(57) ABSTRACT

A system for controlling the flight of aircraft includes an aircraft operated by a human pilot, one or more optionally piloted aircraft controlled by a processor, and a communication link between the aircraft. The optionally piloted aircraft receives data indicative of the position and flight path of the piloted aircraft, and is automatically controlled to maintain a predetermined range of separation distances from the piloted aircraft. Control of the optionally piloted aircraft may include machine reasoning computing functions based on a classification of data received by the communication link, data indicative of the current positions and three-dimensional flight paths of the aircraft, stored data from previously calculated positions and three-dimensional flight paths of the aircraft, and stored data from previously executed flight plans associated with the optionally piloted aircraft.

14 Claims, 4 Drawing Sheets

SYSTEM AND METHOD FOR COOPERATIVE OPERATION OF PILOTED AND OPTIONALLY PILOTED AIRCRAFT

BACKGROUND

Embodiments of the inventive concepts disclosed herein are generally directed to control systems and methods for optionally piloted aircraft.

Unmanned aerial vehicles (UAVs) have rapidly matured in recent years from the relatively simple remote controlled airplanes of the past to sophisticated aircraft that are capable of performing important civilian and military operations and missions. Applications in the past have primarily been directed toward either small platforms for civilian aerial surveying, area surveillance, crop monitoring, search and rescue operations, border monitoring, and the like, or larger military platforms for missions that might place a pilot in danger from opposing forces.

Most UAVs in use today are remotely controlled by a human pilot using a communication link of some type. The role of the communication link may vary depending on the capabilities of the control systems on board the UAV. Simple, basic UAVs such as inexpensive hobby class devices may have very limited on-board control systems, and may depend completely on external control commands and operation by the remotely located human operator to take off, complete the flight mission, and land. A larger and more sophisticated class of UAVs generally characterized as unpiloted aircraft may be equipped with highly capable flight control, autopilot and navigation systems that might enable the unpiloted aircraft to perform one or more predetermined mission operations including takeoff, flight between waypoints, and landing without external control commands from a remotely located human pilot. In situations where communication between the unpiloted aircraft and the remotely located human pilot is lost, the on-board system may take over to maintain the unpiloted aircraft in flight and may possibly continue and complete one or more predetermined portions of the mission.

There is growing interest in a new class of even larger and more capable optionally piloted aircraft that may potentially transport cargo or passengers. This interest is prompted by the economics and business climate for operation of large aircraft, where the salaries and availability of human pilots represent a significant portion of the total cost of operation. At the same time, it is clearly understood that the presence of a human pilot in the flight deck of an aircraft is the traditional expectation for safe operation of the aircraft, especially in rare but sufficiently probable events such as equipment failure or hazardous flying conditions. Autonomous control systems are steadily gaining in capability, but are still much less able to appropriately respond to unexpected situations than a competent, well-trained human pilot.

SUMMARY

In one aspect, embodiments of the inventive concepts disclosed herein are directed to a system for safely controlling the flight of an optionally piloted aircraft by a controller that is in communication with a piloted aircraft.

In a further aspect, embodiments of the inventive concepts disclosed herein are directed to a system for controlling the flight of multiple piloted and optionally piloted aircraft in proximity to each another.

In a still further aspect, embodiments of the inventive concepts disclosed herein are directed to a system for coordinating the flight of multiple piloted and optionally piloted aircraft where the optionally piloted aircraft are configured with a machine-reasoning based controller to perform decision making actions.

In a yet further aspect, embodiments of the inventive concepts disclosed herein are directed to a system for safely passing the lead aircraft role from one piloted aircraft to another aircraft and back.

In a further aspect, embodiments of the inventive concepts disclosed herein are directed to a system and method for flying a plurality of aircraft with fewer pilots than aircraft.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
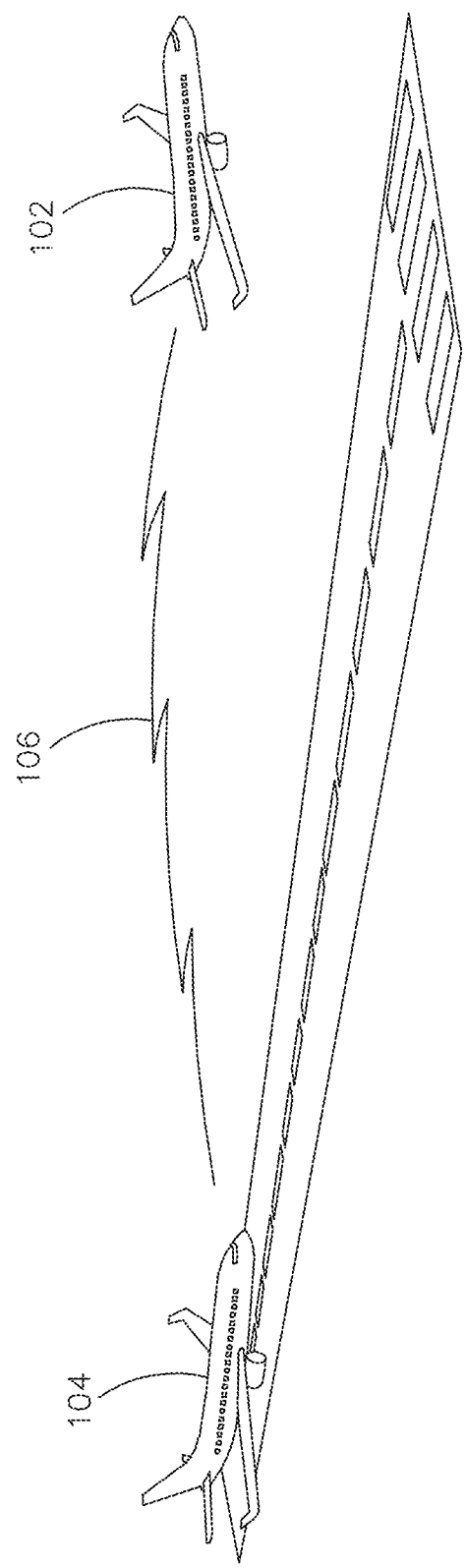
FIG. 1 is a diagram of an exemplary embodiment of a piloted aircraft and an optionally piloted aircraft flying in proximity to each other.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to safe operation of optionally piloted aircraft in cooperation with piloted aircraft.

Referring now to FIG. 1, an embodiment of inventive concepts disclosed herein includes a piloted aircraft 102 and an optionally piloted aircraft 104. The piloted aircraft 102 may be of any type or size, but may preferably be similar to the optionally piloted aircraft 104 so that the flight performance characteristics of the piloted aircraft 102 and the optionally piloted aircraft 104 may generally be similar. These characteristics may include, for example, rate of acceleration, lift, stall speed, rate of climb, air speed, braking, and the like. The piloted aircraft 102 may be operated with little or no knowledge of the flight situation of the optionally piloted aircraft 104, which may be desired to prevent excessive workload for the pilot of the piloted aircraft 102.

Still referring to FIG. 1, the piloted aircraft 102 and the optionally piloted aircraft 104 may be configured with a data link 106 for data communication between the piloted aircraft 102 and the optionally piloted aircraft 104. The data link 106 may communicate the flight situation of the piloted aircraft 102 to the optionally piloted aircraft 104, as well as communicating the flight situation of the optionally piloted aircraft 104 to the piloted aircraft 102. The data link 106 may be configured to communicate over distances between the piloted aircraft 102 and the optionally piloted aircraft 104 ranging from a few meters to tens of kilometers or more. The data link 106 may be configured to communicate at data rates from a few thousand to millions of bits per second or more. The data link 106 may be configured to communicate between the piloted aircraft 102 and the optionally piloted aircraft 104 with latency from a few microseconds to hundreds of milliseconds. The data link 106 may be configured with more than one channel operating on different radio carrier frequencies using different modulation, bandwidth, coding or other radio communication parameters to provide redundancy for availability of the data communication between the piloted aircraft 102 and the optionally piloted aircraft 104. The data link 106 may be configured with forward error correction or other coding techniques to improve the availability of the data communication between the piloted aircraft 102 and the optionally piloted aircraft 104. Trusted communication over the data link 106 may be accomplished using one or more well-known authentication, authorization and/or encryption techniques. Since the data link 106 propagates through free space between the piloted aircraft 102 and the optionally piloted aircraft 104, there may be times that data communication between the piloted aircraft 102 and the optionally piloted aircraft 104 is not possible due to atmospheric or other conditions.

Still referring to FIG. 1, safe operation of the piloted aircraft 102 and the optionally piloted aircraft 104 involves the usual requirements for safe flight, including but not limited to assurance of the condition of the aircraft, assurance that the pilot or pilots are in good health, confirmation of acceptable weather conditions, and confirmation of the airport ground and air traffic status. Safe operation of the piloted aircraft 102 and the optionally piloted aircraft 104 in proximity to one another has an additional requirement to assure that the separation between the piloted aircraft 102 and the optionally piloted aircraft 104 is maintained at sufficiently large distance that there is no danger of the piloted aircraft 102 and the optionally piloted aircraft 104 colliding with one another.

Still referring to FIG. 1, operation of the optionally piloted aircraft 104 further requires automated control of the flight of the optionally piloted aircraft 104. This may include automated control of the aircraft flight control surfaces such as ailerons, elevators, rudder, flaps, slats, and other surfaces that may be present. This may also include but is not limited to automated control of other aircraft functions such as landing gear, brakes, engine throttle, nose wheel steering, warning lights, and the like.

Still referring to FIG. 1, the optionally piloted aircraft 104 may be controlled to fly ahead of or at different altitudes from the piloted aircraft 102 to assess one or more air conditions such as turbulence, weather, or the like, that might adversely affect the smoothness of flight and comfort of passengers in the piloted aircraft 102. The optionally piloted aircraft 104 may be controlled by the piloted aircraft 102 to place the optionally piloted aircraft 104 in a location relative to the piloted aircraft 102 that may enable improved communications with satellite, ground or air located communication resources. The control of the optionally piloted aircraft 104 may be performed by an automated system so that the workload of the pilot of the piloted aircraft 102 is not increased.

Figure 2:
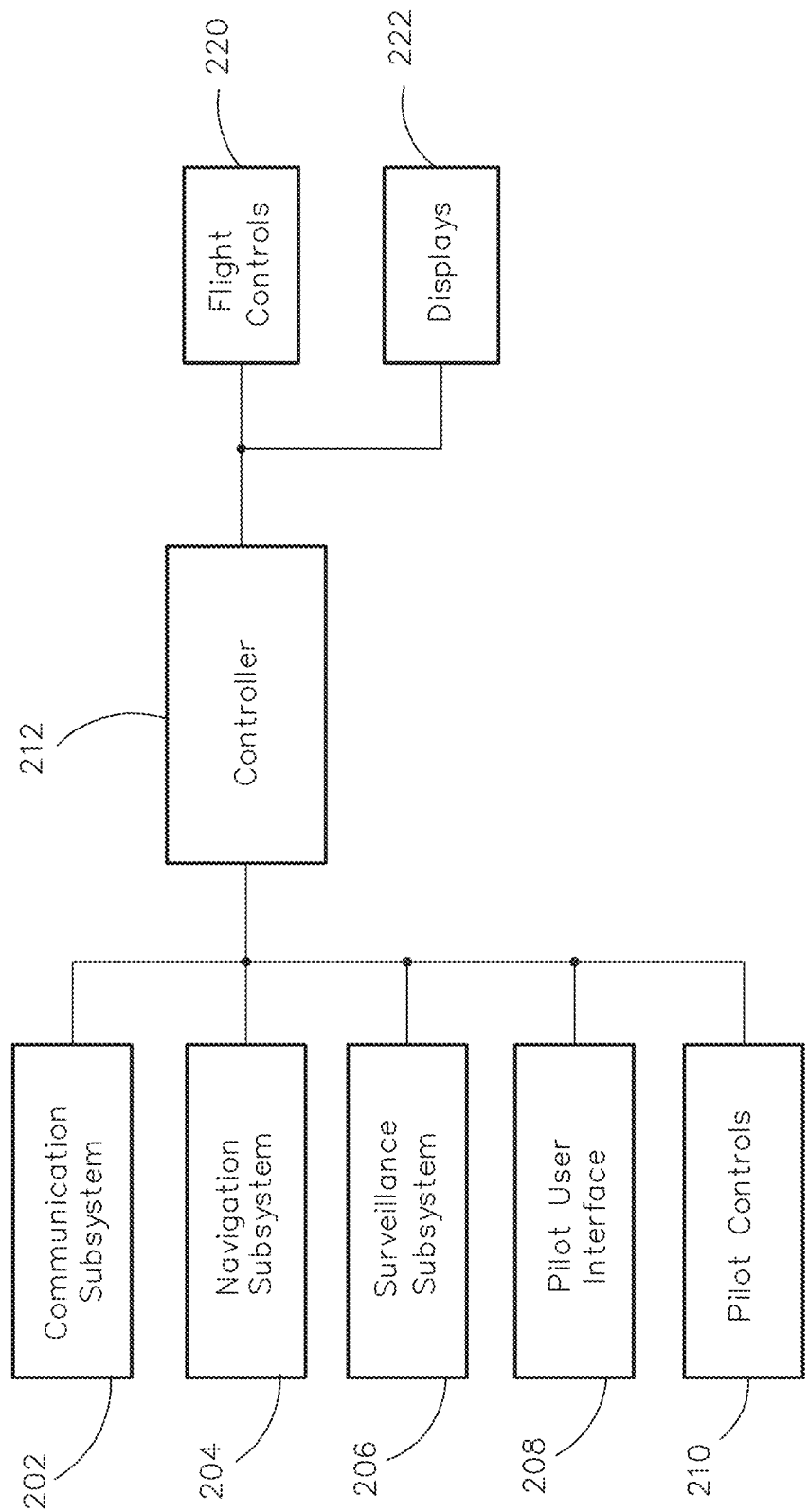
FIG. 2 is a block diagram of a control system for operating a piloted aircraft.

Referring now to FIG. 2, the piloted aircraft 102 may be equipped with a typical suite of electronic sensors, communication systems, controllers and displays used to provide situation awareness and control of the aircraft for the pilot. A communication subsystem 202 may provide voice and data communication for the aircraft for typical air traffic control and flight data reporting. The communication subsystem 202 may also include an additional data link to support data communication to one or more optionally piloted aircraft 104 that may be in proximity to the piloted aircraft 102. A navigation subsystem 204 may include flight plan navigation via waypoints, a Global Positioning Satellite (GPS) navigation system, a Very High Frequency (VHF) Omnidirectional Range (VOR) system, an Instrument Landing System (ILS), a Distance Measuring Equipment (DME) system, an Automatic Direction Finder (ADF) system, an Inertial Navigation System (INS), a Radio Altimeter (RA), and the like. A surveillance subsystem 206 may include weather radar (WxR), Traffic Collision Avoidance System (TCAS), Automatic Dependent Surveillance-Broadcast (ADS-B) system, a transponder system, an Enhanced Vision System (EVS), and the like.

Still referring to FIG. 2, a pilot user interface system 208 may include knobs, buttons, touch screens, track pads, cursor control devices, and the like for pilot interaction and control of aircraft systems. The pilot controls 210 may include a control yoke or stick, foot pedals, side stick controllers, levers, throttle controls, and the like for pilot control of flight surfaces of the aircraft. The controller 212 may function to receive inputs from each of the communications subsystem 202, the navigation subsystem 204, the surveillance subsystem 206 the pilot user interface 208 and the pilot controls 210. The controller 212 may provide an output to each of the flight controls 220 for operation of aircraft flight control surfaces as well as the displays 222 for displaying information to the pilot. The flight controls 220 may cause movement of control surfaces, engine throttles, landing gear, brakes, and other mechanical components to affect the movement of the aircraft on the ground and in the air. The displays 222 provide situation, control and status information to the pilot for operation of the aircraft.

Figure 3:
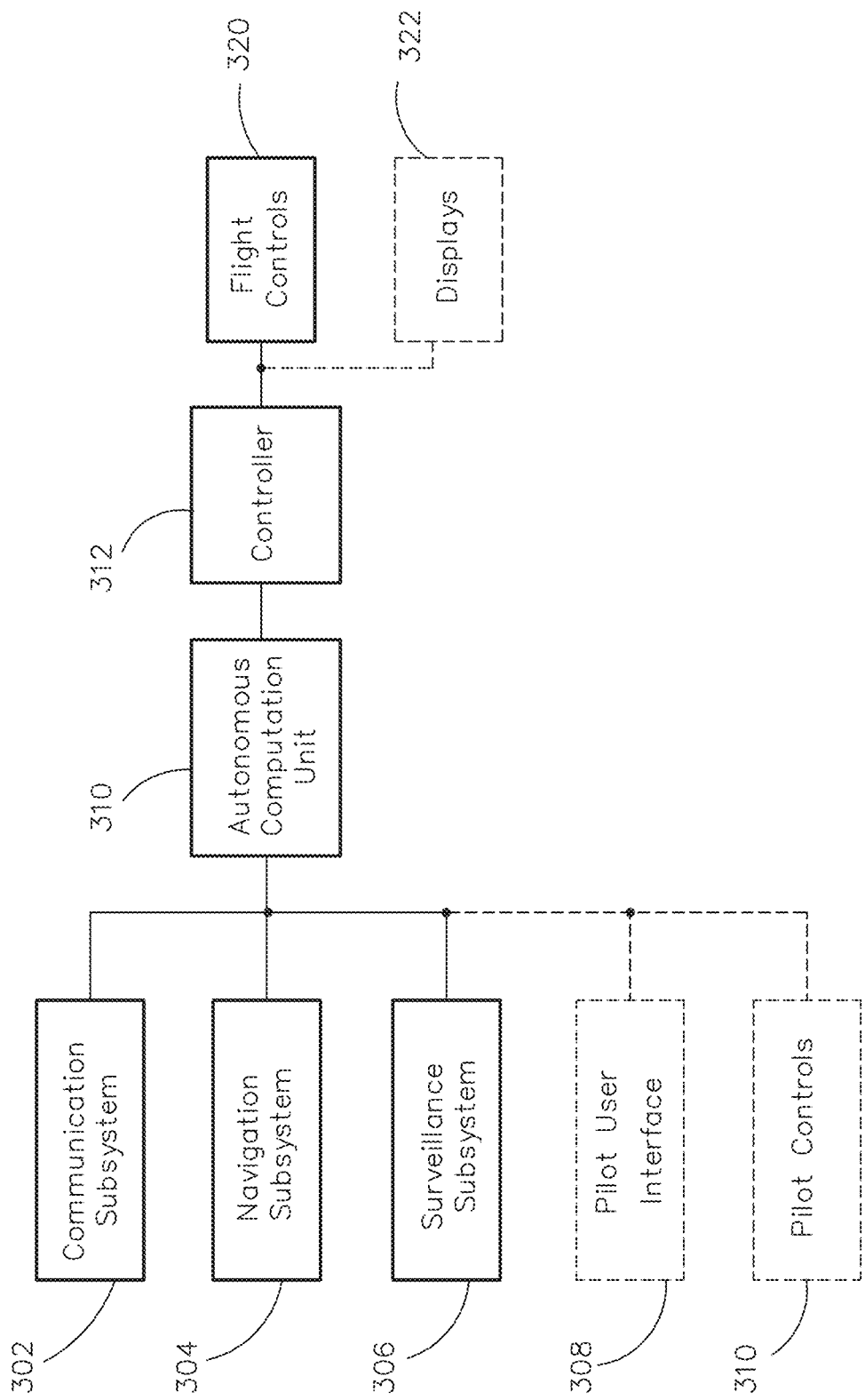
FIG. 3 is a block diagram of a control system for operating an optionally piloted aircraft operating in proximity to a piloted aircraft.

Referring now to FIG. 3, the piloted aircraft 102 and the optionally piloted aircraft 104 may generally be equipped with the same or similar suite of avionics equipment, but when the optionally piloted aircraft 104 is operating autonomously, certain equipment in the optionally piloted aircraft 104 may not be used. For example, in autonomous flight mode, the primary flight display and other displays in the flight deck of the aircraft may not be used if there is no pilot present in the flight deck in that mode of operation.

Still referring to FIG. 3, a communication subsystem 302 may include voice and data communication capabilities for communication with air traffic control and other aircraft. A navigation subsystem 304 may include a Global Positioning Satellite (GPS) navigation system, a Very High Frequency (VHF) Omnidirectional Range (VOR) system, an Instrument Landing System (ILS), a Distance Measuring Equipment (DME) system, an Automatic Direction Finder (ADF) system, an Inertial Navigation System (INS), a Radio Altimeter (RA), and the like. A surveillance subsystem 306 may include weather radar (WxR), Traffic Collision Avoidance System (TCAS), Automatic Dependent Surveillance-Broadcast (ADS-B) system, a transponder system, an Enhanced Vision System (EVS), and the like. The flight controls 320 may cause movement of control surfaces, engine throttles, landing gear, brakes, and other mechanical components to affect the movement of the aircraft on the ground and in the air. The pilot user interface 308, the pilot controls 310 and the displays 322 may be present in the aircraft, but may be unused when the aircraft is operating autonomously.

Still referring to FIG. 3, an autonomous computation unit 310 may be configured to provide autonomous inputs to the controller 312. The autonomous computation unit 310 may be operatively coupled to the communication subsystem 302, the navigation subsystem 304, and the surveillance subsystem 306. The autonomous computation unit 310 may be configured with a machine reasoning system such as is described in the Verified Inference Engine for Autonomy by David S. Hardin, having U.S. patent application Ser. No. 15/264,587 filed on Sep. 13, 2016, which is incorporated herein by reference in its entirety. The machine reasoning system may initially be provisioned to operate the optionally piloted aircraft 104 according to a predetermined flight plan, and may acquire data from the communication subsystem 302, the navigation subsystem 304, and the surveillance subsystem 306 during the flight to learn from the experience of the flight, follow the piloted aircraft 102, perform route planning calculations to avoid hazards such as weather, terrain, as well as other aircraft, and steadily improve the ability of the autonomous computation unit 310 to operate the aircraft. The acquired data from the communication subsystem 302, the navigation subsystem 304, and the surveillance subsystem 306 may be accumulated and stored in the memory or file storage of the autonomous computation unit 310 for retrieval and use by the autonomous computation unit 310 for post-flight analysis of the present flight and/or autonomous control of future flights.

Still referring to FIG. 3, the autonomous computation unit 310 may become sufficiently trained over many flights to take on more complex and challenging flight operations than simply following a piloted aircraft. With appropriate and sufficient experience and training, the autonomous computation unit 310 may be capable of completing an entire flight without being in proximity to a piloted aircraft. The accumulated experience and training acquired by the autonomous computation unit 310 may be shared with a machine reasoning system in the piloted aircraft 102, which may assist the pilot as a resource for decision aiding and work load reduction. The accumulated experience and training acquired by the autonomous computation unit 310 accompanied by the rich set of situation and surveillance sensors may be employed by either the piloted aircraft 102 or the optionally piloted aircraft 104 to serve as a pilot assistant that may make recommendations on re-routing the flight, responding to a hazardous condition, or recovering from an equipment fault. The machine reasoning system in the autonomous computation unit 310 may utilize its accumulated experience and training to augment one or more predetermined baseline flight planning tools to enable autonomous route planning for part or all of a flight.

Still referring to FIG. 3, both the piloted aircraft 102 and the optionally piloted aircraft 104 may be configured with autonomous computation units 310, which may share machine reasoning information by way of the data link 106. Each of the autonomous computation units 310 may serve as a monitor for the other by observing the behaviors of the other and comparing those behaviors to locally determined behaviors to ensure that the behaviors are generally similar, reasonable and appropriate. In some embodiments, each of the autonomous computation units 310 may be operatively coupled to a non-machine reasoning based monitor function that may be configured to observe the sensor inputs and controller outputs of the autonomous computation units 310 to ensure that the behaviors of the autonomous computation units 310 are associated with the correct operating modes and stay within predetermined limits.

Still referring to FIG. 3, loss of data communication between the piloted aircraft 102 and the optionally piloted aircraft 104 may occasionally occur in certain weather or other conditions. The piloted aircraft 102 may continue in normal fashion. The optionally piloted aircraft 104 may be without the benefit of the information received from the piloted aircraft 102, but it may still operate in autonomous fashion relying on its own communication subsystem 302, navigation subsystem 304 and surveillance subsystem 306. If the data communication link between the piloted aircraft 102 and the optionally piloted aircraft 104 is interrupted, the autonomous computation unit 310 in the optionally piloted aircraft 104 may control the flight of the optionally piloted aircraft 104 to increase the distance between the piloted aircraft 102 and the optionally piloted aircraft 104 for additional safety margin. In some embodiments, surveillance sensors such as ADS-B sensors may provide indication of the positions of the piloted aircraft 102 and the optionally piloted aircraft 104 as well as other aircraft. The autonomous computation unit 310 in the optionally piloted aircraft 104 may utilize this information to control the flight of the optionally piloted aircraft 104 to maintain a safe distance between the piloted aircraft 102 and the optionally piloted aircraft 104.

Still referring to FIG. 3, the piloted aircraft 102 may serve as a remote controller for the optionally piloted aircraft 104 if the autonomous computation unit 310 of the optionally piloted aircraft 104 fails or is damaged in flight. In this case, the pilot of the piloted aircraft 102 may assume the responsibility to operate the piloted aircraft 102, and an autonomous computation unit 310 in the piloted aircraft 102 may be configured to operate the optionally piloted aircraft 104. Communication, navigation and surveillance data from the optionally piloted aircraft 104 may be shared with an autonomous computation unit 310 in the piloted aircraft 102 by way of the data link, and control commands from the autonomous computation unit 310 in the piloted aircraft 102 may be sent to the optionally piloted aircraft 104 by way of the data link to enable continuation of the mission, all without increasing the workload of the pilot of the piloted aircraft 102.

Figure 4:
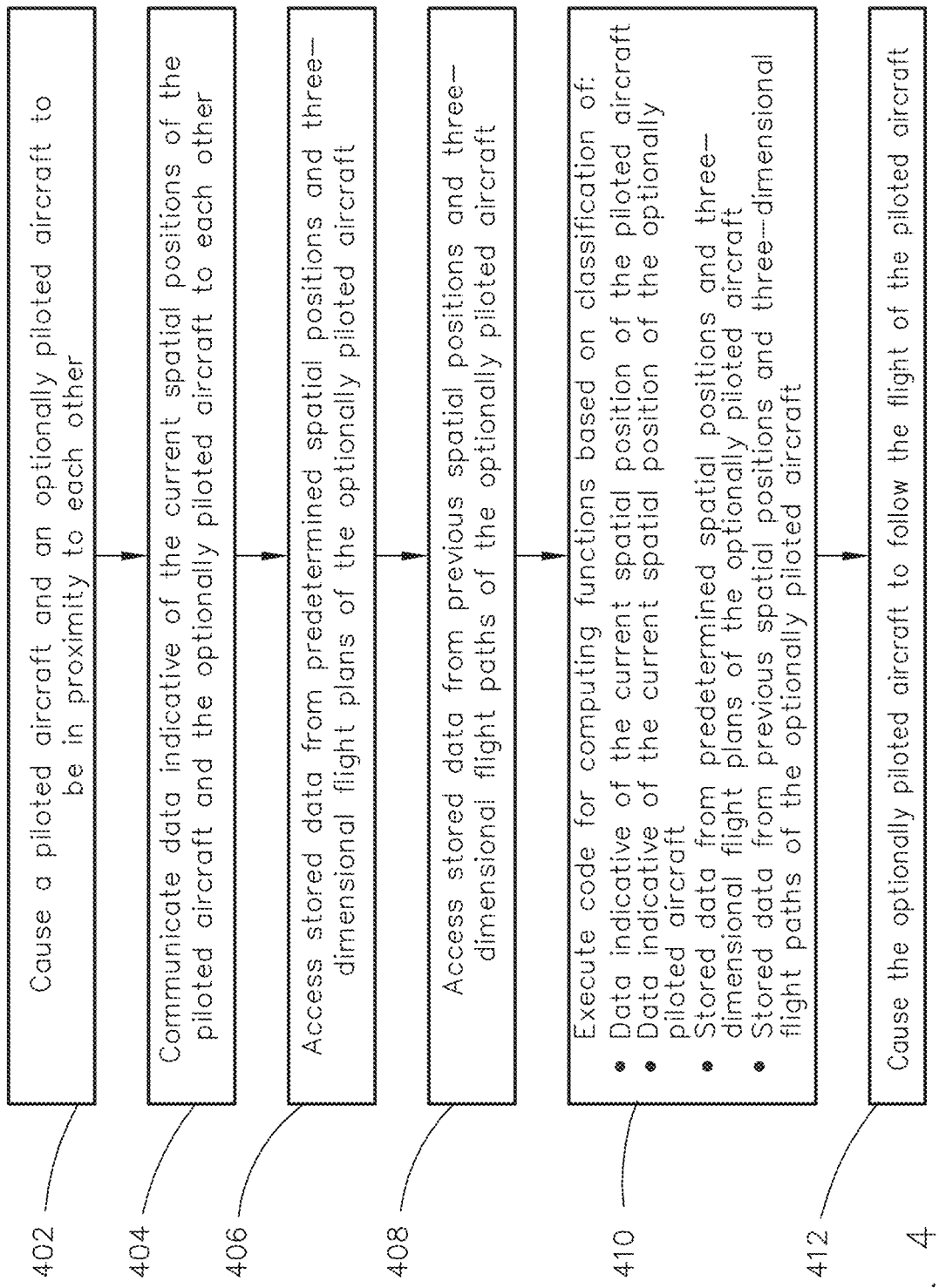
FIG. 4 is a diagram of an exemplary embodiment of a method for safely operating piloted aircraft and optionally piloted aircraft in proximity to each other.

Referring now to FIG. 4, an exemplary embodiment of a method according to the inventive concepts disclosed herein may include one or more of the following steps.

In a step 402, a piloted aircraft and an optionally piloted aircraft may be located in proximity to each other.

In a step 404, the piloted aircraft and the optionally piloted aircraft may communicate data indicative of the spatial position of each aircraft to each other.

In a step 406, stored data from predetermined spatial positions and three-dimensional flight plans of the optionally piloted aircraft may be accessed by a processor.

In a step 408, stored data from previous spatial positions and three-dimensional flight paths of the optionally piloted aircraft may be accessed by a processor.

In a step 410, the processor may execute code for computing functions based on classification of one or more of data indicative of the current spatial position of the piloted aircraft, data indicative of the current spatial position of the optionally piloted aircraft, stored data from predetermined spatial positions and three-dimensional flight plans, and stored data from previous spatial positions and three-dimensional flight paths.

In a step 412, the optionally piloted aircraft may be controlled to follow the flight of the piloted aircraft. In some embodiments, the optionally piloted aircraft may be controlled to maintain a predetermined range of distances from the piloted aircraft. In some embodiments, the optionally piloted aircraft may be autonomously controlled to complete the flight without data from the piloted aircraft.

As will be appreciated from the above, the system and method according to embodiments of the inventive concepts disclosed herein may safely control the flight of an optionally piloted aircraft by a controller that maintains trusted communication with a piloted aircraft.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for controlling aircraft, comprising:
   a first aircraft configured to be operated by a human pilot and having a first current position and a first current three-dimensional flight path;
   at least one second aircraft having at least one processor coupled with a non-transitory processor-readable medium storing processor-executable code for causing the at least one processor to control a current second three-dimensional flight path of the at least one second aircraft;
   a data link associated with each of the first aircraft and the at least one second aircraft configured for exchanging data indicative of a first spatial position of the first aircraft and a second spatial position of the at least one second aircraft relative to one another;
   the at least one processor associated with the at least one second aircraft configured for:
   accessing data from a plurality of previous second positions and second three-dimensional flight paths of the at least one second aircraft;
   accessing data from at least one previously executed flight plan associated with a previously observed second position and a second three-dimensional flight path of the at least one second aircraft;
   controlling at least one flight control surface of the at least one second aircraft causing the at least one second aircraft to follow the first current three-dimensional flight path of the first aircraft, the control based on a classification of:
   data indicative of the first spatial position of the first aircraft received via the data link;
   data indicative of the second spatial position of the at least one second aircraft;
   data from a plurality of previous second positions and second three-dimensional flight paths of the at least one second aircraft; and
   data from at least one previously executed flight plan associated with a previously observed second position and a second three-dimensional flight path of the at least one second aircraft.

2. The system of claim 1, wherein the at least one processor associated with the at least one second aircraft is further configured to control the current second three-dimensional flight path of the at least one second aircraft based on an output of an autonomous computation unit associated with the at least one second aircraft to a controller associated with the at least one second aircraft, the autonomous computation unit including an inference engine.

3. The system of claim 2, wherein the at least one processor associated with the at least one second aircraft is further configured to control the second three-dimensional flight path of the at least one second aircraft so that the second current position of the at least one second aircraft is within a predetermined range of distances from the first current position of the first aircraft.

4. The system of claim 3, wherein the predetermined range of distances comprise a minimum separation distance between the first aircraft and the at least one second aircraft.

5. The system of claim 3, wherein the at least one processor associated with the at least one second aircraft is further configured to:
   determine loss of communication with the first aircraft within a predetermined period of time; and
   initiate a safe mode for the at least one second aircraft such that the second current position of the at least one second aircraft is within a safe distance larger than the predetermined range of distances from the first current position of the first aircraft.

6. The system of claim 2, wherein the at least one processor associated with the at least one second aircraft is further configured to provide, via the communication link, a re-route recommendation, a hazardous condition response, and an equipment fault recovery to the first aircraft.

7. The system of claim 2, wherein the at least one processor associated with the at least one second aircraft is further configured to control the at least one second aircraft by determining whether control of the second aircraft is within a predetermined range of control limits.

8. The system of claim 1, wherein the first aircraft is further configured with at least one second processor coupled with a non-transitory processor-readable medium storing processor-executable code for causing the at least one second processor to:
   access data indicative of the first current position and the first current three-dimensional flight path of the first aircraft;
   receive data, via the communication link, from the at least one second aircraft indicative of the second current position and the second current three-dimensional flight path of the at least one second aircraft; and
   control the first aircraft via an output of an inference engine within the at least one second processor based on a classification of:
      the data indicative of the first current position and the first current three-dimensional flight path;
      the data indicative of the second current position and the second current three-dimensional flight path of the at least one second aircraft;
      stored data indicative of a plurality of previous first positions and first three-dimensional flight paths of the first aircraft; and
      stored data from at least one previously executed flight plan associated with a previously observed first position and a first three-dimensional flight path of the first aircraft.

9. The system of claim 8, wherein the first aircraft at least one second processor is further configured to:
   monitor a control of the at least one second aircraft; and
   confirm that the control of the at least one second aircraft is applied within a predetermined minimum and maximum control limit.

10. The system of claim 1, wherein the at least one processor associated with the at least one second aircraft is further configured to generate a flight plan for the at least one second aircraft different from a flight plan of the first aircraft.

11. A method of controlling aircraft comprising:
   exchanging, via a data link, data indicative of a first spatial position of a first aircraft and a second spatial position of at least one second aircraft relative to one another;
   accessing, by at least one processor associated with the at least one second aircraft, data from a plurality of previous second positions and second three-dimensional flight paths of the at least one second aircraft;
   accessing, by the at least one processor, data from at least one previously executed flight plan associated with a previously observed second position and a second three-dimensional flight path of the at least one second aircraft;
   executing, by the at least one processor, executable code for causing the at least one processor associated with the at least one second aircraft to control at least one flight control surface of the at least one second aircraft causing the at least one second aircraft to follow the current three-dimensional flight path of the first aircraft, the control based on a classification of:
   data indicative of the first spatial position of the first aircraft;
   data indicative of the second spatial position of the at least one second aircraft;
   data from a plurality of previous second positions and second three-dimensional flight paths of the at least one second aircraft; and
   data from at least one previously executed flight plan associated with a previously observed second position and a second three-dimensional flight path of the at least one second aircraft.

12. The method of claim 11, wherein the at least one second aircraft is unpiloted.

13. The method of claim 11, wherein the at least one second processor is further configured with an autonomous computation unit including an inference engine.

14. The method of claim 11, wherein the at least one first processor is further configured for control of the second three-dimensional flight path of the at least one second aircraft so that the second spatial position of the at least one second aircraft is within a predetermined range of distances from the first spatial position of the first aircraft.

* * * * *